Dec. 22, 1931.  M. W. McCONKEY  1,837,464
BOOSTER BRAKE
Filed March 24, 1923
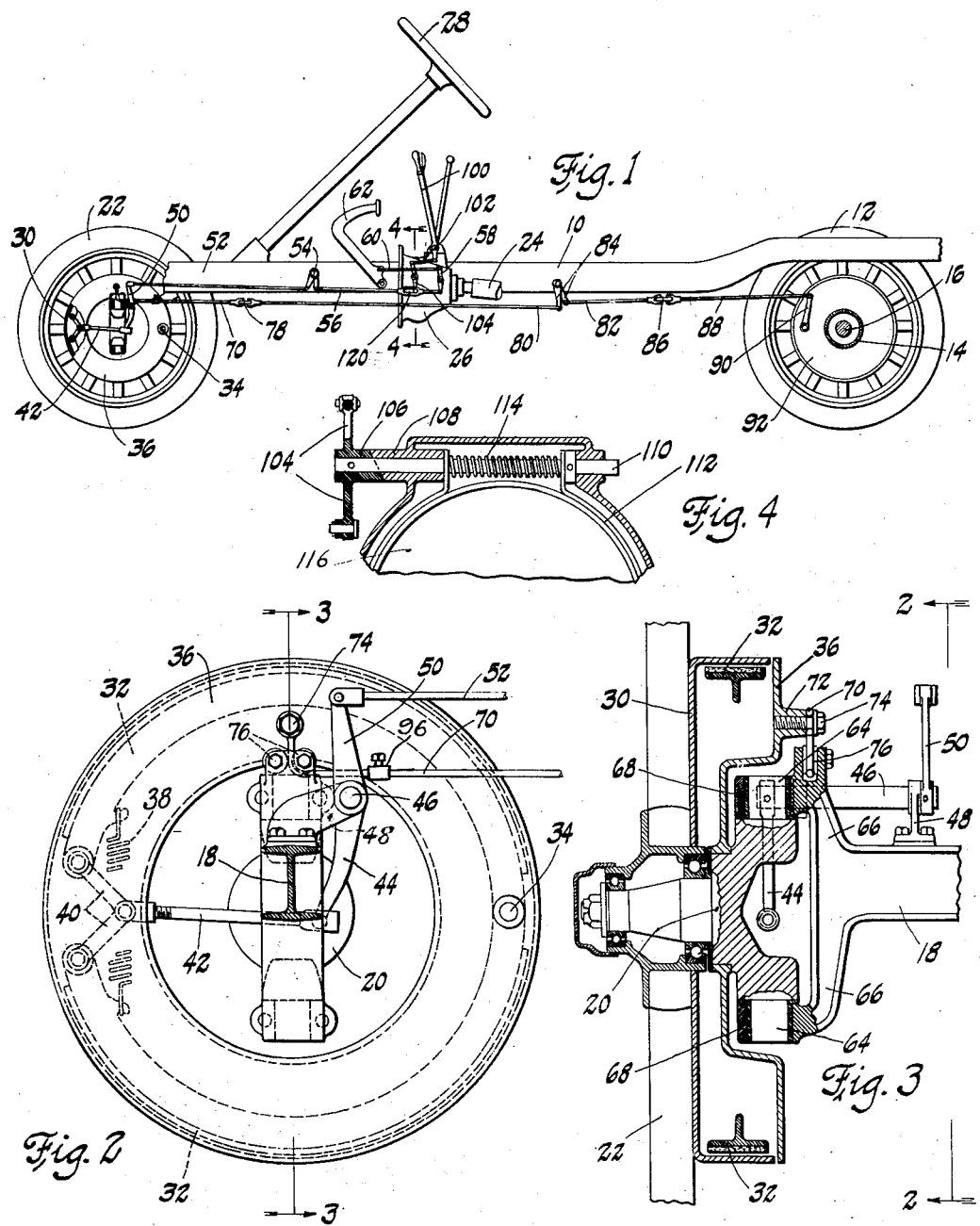
Inventor
Montgomery W. McConkey
By Attorney
Blackmore, Spencer & Fleet Patented Dec. 22, 1931

1,837,464

UNITED STATES PATENT OFFICE

MONTGOMERY W. McCONKEY, OF DETROIT, MICHIGAN, ASSIGNOR TO GENERAL MOTORS CORPORATION, OF DETROIT, MICHIGAN, A CORPORATION OF DELAWARE

BOOSTER BRAKE

Application filed March 24, 1923. Serial No. 627,439.

This invention relates to vehicles having brakes, and is illustrated as embodied in an automobile having a system of four-wheel "booster" brakes, i. e. brakes arranged to be applied by power derived, for example, from the momentum of the moving car.

Previous booster brakes, so far as I am aware have either been arranged so that a brake on one of the wheels is operative to set another brake on the same wheel, or else a brake (or clutch) on the transmission or one of the axles is operative to set brakes on the wheels. In the first arrangement twice the usual number of brakes is required, and even in the second arrangement an extra brake is necessary. Especially when it is desired to to use four-wheel service brakes, these arrangements involve a higher cost which is prohibitive on moderately priced cars and which is a serious question even with expensive cars.

An important object of the invention is to reduce the cost of a booster brake system, without impairing its efficiency, by eliminating the extra brake or brakes while preserving the "boosting" functions by the use of novel connections and by modifying the form of one or more of the regular brakes in a manner which is believed to be wholly new, so that a brake on one wheel is operative to apply a brake on a different wheel. While not necessarily so limited, the invention is especially adapted for embodiment in a four wheel brake system, in which there is a set of front wheel brakes and a set of rear wheel brakes, and the one set of brakes operates, under the control of the driver, to apply the other set. In the illustrated embodiment of the invention, driver-controlled front wheel brakes of novel construction operate as described to apply the rear wheel brakes.

Other features of the invention relate to an arrangement of an emergency brake lever, connected to a transmission or other emergency brake, to apply the service brakes if the emergency brake fails to hold; to the use of novel safety stops with the above-described booster brakes so that they will be effective even if the connections are broken in such a manner as to eliminate the balancing resistance of the final brakes; and to other novel combinations and desirable particular constructions which will be apparent from the following description of the illustrative embodiment of the invention shown in the accompanying drawings, in which:

Figure 1 is a diagrammatic longitudinal sectional view through an automobile showing the four-wheel and emergency brake connections;

Figure 2 is a view from substantially the same point of view as Figure 1, and on the line 2—2 of Figure 3, but on an enlarged scale, showing one of the front wheel or "booster" brakes;

Figure 3 is a section on the line 3—3 of Figure 2 showing the arrangement of the parts of the brake with respect to the front axle; and Figure 4 is a section on the line 4—4 of Figure 1 showing the arrangement of the emergency brake on the transmission.

In the particular arrangement selected for illustration the invention is applied to an automobile having a chassis frame 10 supported through the medium of springs (not shown) by rear wheels 12, mounted on a rear axle casing 14 and driven by drive shafts 16, and by a front axle 18 pivotally connected to steering knuckles 20 carrying front wheels 22. The drive shafts 16 are geared in the usual manner through a differential mechanism to a propeller shaft in a casing 24, the shaft being connected by a universal joint to an engine-driven transmission 26. The front wheels are of the usual dirigible form, the steering knuckles 20 being angularly moved with respect to axle 18 by any suitable steering connections controlled by a steering wheel 28.

According to the present invention, drums 30 are secured to the front wheels 22 to rotate therewith, and within each drum is arranged a brake band shown as comprising a pair of shoes 32 of the "scissors" type pivoted on a pin 34 carried by an angularly movable support such as a plate 36, which is carried by the corresponding steering knuckle 20 in such a manner as to be capable of limited angular movement about the axis of the wheel and drum. The shoes 32 are normally held in their idle position by a spring 38, and are expanded into frictional engagement with drum 30 by a pair of toggle members 40 operated by a connecting link 42, the link 42 being connected by a ball-and-socket joint to an operating lever 44 carried by a rock shaft 46 supported in bearings in a pair of brackets 48 fastened to axle 18. Rock shaft 46 is operated to apply the brake by an arm 50, and the arm 50 for each front wheel brake is connected by a link 52 to an arm on one end of a brake-operating rock shaft 54. Rock shaft 54 is connected by a link 56, a lever 58, and a second link 60 with the service brake pedal 62.

It will be noted that when the brake shoes are expanded to their operative positions, the ball-and-socket connection between lever 44 and link 42 is substantially at the intersection of the axis of wheel 22 and drum 30 with the steering axis about which the wheel is turned by manipulation of steering wheel 28. Thus angular movement of support 36 does not affect the setting of the brake, nor does manipulation of the steering wheel. In order to make this possible, one convenient arrangement dispenses with the usual king pin, the knuckle 20 being formed with a pair of cylindrical extensions 64 journaled in bearings formed in oppositely-extending arms 66 of axle 18 by the use of separable bearings caps 68.

It will be seen that when the shoes 32 are expanded into frictional engagement with drum 30 by manipulation of the service brake pedal 62, they will transmit torque from the drum through the anchor or pivot pin 34 to the angularly movable support or plate 36, which will turn in either a clockwise or counterclockwise direction, according to which direction the drum is turning. Movement of the supports for the two front brakes in this manner is utilized to apply the rear wheel brakes as explained above, by attaching a cable 70 to a lug 72 projecting from each plate by means of a bolt 74, the cable being arranged to pass between a pair of rollers 76 carried by an extension of the upper arm 66 of the front axle 18 so that whichever direction the plate turns the cable will be placed under tension. The cables 70 from the opposite front wheel brakes are connected to opposite ends of an equalizing bar 78, which is in turn connected by a pair of links 80 and 82 (which may, if desired, be supported at intermediate points by rock arms 84) to a rear equalizing bar 86. Bar 86 is connected at its opposite ends by means of links 88 to rock arms 90 operating the rear wheel brakes 92. The form of the equalizer bars may be the same as bars 30 and 28 shown in Figure 1 of Reissue Patent No. 14,155, granted June 20, 1916, on application of H. S. Morton.

In the operation of the above described connections, when the cables 70 are placed under tension by angular movement of plates 36, arms 90 are rocked by the above described connections to apply the rear wheel brakes. When the rear wheel brakes become set in a degree depending on the extent of depression of the brake pedal 62, they offer sufficient resistance to the further operation of the connections from the front wheel brakes so that cables 70 operate as anchors to hold the plates 36 against further angular movement, whereupon the front wheel brakes also become operative to retard movement of the vehicle by friction of bands 72 against drum 30. It will be appreciated that the angular movement of plates 36 necessary to set the rear wheel brakes is sufficiently small so that it takes place very quickly and therefore the front wheel brakes become effective in a very short space of time after the depression of the brake pedal.

When the brake pedal is released, the various parts are returned to their idle positions by suitable return springs (not shown), one of which operates on each cable 70 to return each plate 36 to the position shown in Figure 2.

The invention also provides for guarding against breakage in the brake-operating connections by providing a safety stop 96 on each cable 70, in such a position that if the connections to the rear wheel brakes are broken at any point these stops will engage the extensions of axle 18 which support the rollers 76, thus limiting angular movement of the plates 36 so that the front wheel brakes will remain operative.

According to another feature of the invention, an emergency brake lever 100 is arranged to operate an emergency brake on the transmission, and is also provided with a lost-motion connection to the service brakes so that it operates the toggles 40 at the time the emergency brake is applied. The emergency brake is usually applied when the car is at rest, so that the service brakes do not actually come on when the lever 100 is manipulated, but the connections are set in such a manner that, if the emergency brake should fail to hold, movement of the car in either direction will automatically throw on the four-wheel service brakes. In the arrangement illustrated in the drawings, lever 100 is pivotally mounted on the transmission and is connected by a link 102 to a lever 104 formed with a cam portion 106, which cooperates with a corresponding fixed cam portion 108 in such a manner that the cams apply tension to a sliding rod 110 pinned to the lever 104, to contract a transmission brake band 112 against the resistance of a spring 114 into engagement with a drum 116 mounted in the transmission. The lower end of lever 104 operates in a slotted portion 120 of the link 56 which operates rock shaft 54.

In the operation of the emergency brake connections, manipulation of the emergency lever 100 turns the cam 106 to contract the transmission brake band 112, and at the same time pulls the link 56 in a direction to straighten the toggles 40 of the front wheel brakes. As long as the car remains at rest the service brakes are not effective, since the rear wheel brakes are only applied by angular movement of plates 36 of the front wheel brakes and since the front wheel brakes do not become effective to retard movement of the car until plates 36 are anchored by the application of the rear wheel brakes. However, if the emergency brake 112 should fail to hold, movement of the car in either direction would promptly throw on all four of the service brakes.

While one embodiment of my invention has been illustrated and described, it is not my intention to limit its scope to that particular embodiment or otherwise than by the terms of the appended claims.

I claim:

1. A vehicle having, in combination, a booster brake system and connections therefor, an emergency brake, a driver-controlled emergency brake operating member, and an auxiliary connection therefrom for setting the booster brake connections so that the system will be operated by movement of the vehicle if the emergency brake fails to hold.

2. A vehicle having, in combination, a four-wheel brake system, connections therefor, an emergency brake, a driver-controlled emergency brake operating member, and an auxiliary connection from said member for mechanically operating the four-wheel brake system if the emergency brake fails to hold.

3. A brake comprising, in combination, a dirigible wheel movable about a substantially vertical steering axis, a drum rotable with the wheel, an angularly-movable carrier adjacent the drum, a brake band, band-operating connections including a part mounted on the carrier and an operating part swiveled thereto substantially at the intersection of the steering axis and the axis of rotation of the wheel and drum, and operating connections for a different brake constructed and arranged to be operated by angular movement of the carrier.

4. A brake comprising, in combination, a rotatable drum, an angularly-movable carrier adjacent the drum, a brake band arranged to turn the carrier angularly when in frictional engagement with the drum, a fixed guide, and an operating cable for a different brake attached to the carrier and passing through the guide to be pulled through the guide by angular movement of the carrier either clockwise or counter-clockwise.

5. A brake comprising, in combination, a rotatable friction member, an angularly-movable carrier adjacent said member, a cooperating friction member arranged to turn the carrier angularly when in frictional engagement with the rotatable member, a fixed guide, and an operating cable for a different brake attached to the carrier and passing through the guide to be pulled through the guide by angular movement of the carrier either clockwise or counter-clockwise.

6. A brake comprising, in combination, a rotatable friction member, an angularly-movable carrier adjacent said member, a cooperating friction member arranged to turn the carrier angularly when in frictional engagement with the rotatable member, a fixed guide, an operating cable for a different brake attached to the carrier and passing through the guide, and a stop to limit angular movement of the carrier as the cable is pulled through the guide.

7. A brake, comprising a wheel, a drum thereon, a plate mounted for rotary movement coaxially of the wheel, brake shoes pivoted thereto for engaging the drum, manually operable means for applying the shoes to the drum, a lug on the plate, a second brake, flexible means permanently connected to the lug and the second brake operable to apply the second brake upon the rotation of the plate in either direction, the application of the second brake serving to hold the plate from further rotation and thereby to produce relative movement between the drum and the brake shoes of the first brake.

8. In a brake mechanism, a rotating member, a carrier having a limited movement of rotation on the same axis, shoes on the carrier, means to effect the engagement of the shoes with the rotating member, a member fixed in position relative to the brake members, a flexible member directly connected to the carrier and passing angularly around said fixed member and connected to a second brake, whereby when the shoes are engaged with the rotary member the carrier will first rotate and by means of the flexible connection will apply a second brake.

9. The combination of a front wheel brake and a rear wheel brake, comprising a front axle, a steering knuckle, a steering wheel thereon, the wheel having a brake drum, a carrier mounted rotatably on the steering knuckle, brake shoes carried by the carrier, means independent of the carrier for applying the shoes, a lug on the carrier, a roller on the axle, means attached to the lug and passing over the roller, mechanism connecting said means to the rear wheel brake.

In testimony whereof I affix my signature.

MONTGOMERY W. McCONKEY.